United States Patent [19]

Arbogast

[11] 4,056,313
[45] Nov. 1, 1977

[54] MULTIPLE MIRRORED APPARATUS UTILIZING SOLAR ENERGY

[76] Inventor: Porter R. Arbogast, 281 W. Langhorne Ave., Bethlehem, Pa. 18017

[21] Appl. No.: 696,176

[22] Filed: June 15, 1976

[51] Int. Cl.$^2$ .................. G03B 21/00; F24J 3/02; G02B 5/08
[52] U.S. Cl. .................. 353/3; 126/270; 237/1 A; 350/299
[58] Field of Search .................. 353/3; 350/299; 126/270, 271; 237/1 A

[56] References Cited

U.S. PATENT DOCUMENTS

| | | | |
|---|---|---|---|
| 509,390 | 11/1893 | Paine | 353/3 |
| 1,111,239 | 9/1914 | Smelser | 353/3 |
| 2,471,954 | 5/1949 | Harvey | 350/292 |
| 3,466,119 | 9/1969 | Francia | 353/3 |

Primary Examiner—Steven L. Stephan
Attorney, Agent, or Firm—Fred Fisher

[57] ABSTRACT

Multiple mirrored apparatus utilizing solar energy can be utilized to direct the rays of the sun in a concentrated and steadily directed fashion to one spot during the whole of the period of sunshine. Such apparatus can be termed a heliostat.

As disclosed, the heliostat includes a plurality of mirrors which are arranged in an array of rows and columns, wherein each mirror has a reflective surface and a rear surface and a central axis through each surface. Each elongated rod of a like plurality is coupled at one end thereof to the rear surface of the corresponding mirror and oriented along the central axis thereof. Means are provided for pivoting each rod near the one end with respect to a plurality of support structures. First guide rails are coupled to the support structures, each pair being spaced apart to form a track therebetween for receiving depending portions of the rods so that the rods traverse pivotable paths within the tracks, within planes each perpendicular to a first common fixed plane, such as a north-south plane. Each of a plurality of pairs of second guide rails, each pair being spaced apart to form a track therebetween, receive depending portions of the rods near their opposite ends so that the rods traverse pivotable paths within the tracks within planes each perpendicular to a second common fixed plane, such as, for example, the east-west plane. The second common fixed plane is perpendicular to the first fixed plane. A plurality of arms couple the second guide rails to a frame so that the arms are pivotable with respect to the frame. First means are provided for pivoting all of the first guide rails along loci parallel to the first fixed plane, and second means are provided for pivoting all of the second guide rails along loci parallel to the second fixed plane.

One of the pivoting means can be reciprocated relative to the apparent east-west movement of the sun, whereas the other reciprocating means can be pivoted relative to the apparent north-south movement of the sun.

In one form, the heliostat can include a mirror, means for pivoting the mirror about an east-west direction on a daily cycle and means for continuously (not intermittently) pivoting the mirror about a north-south direction on an annual cycle.

2 Claims, 3 Drawing Figures

MULTIPLE MIRRORED APPARATUS UTILIZING SOLAR ENERGY

BACKGROUND OF THE INVENTION

1. Field of the Invention

This invention relates to multiple mirrored apparatus utilizing solar energy and in particular, to a heliostat for directing the rays of the sun upon a common point, such as a boiler, continuously during periods of sunshine as the sun traverses from an east direction to a westerly direction during a daily cycle and as the sun traverses between the tropics of Cancer and Capricorn on an annual cycle. Accordingly it is a general object of this invention to provide new and improved devices of such character.

2. Description of the Prior Art

It is known in the past, that a heliostat has a function of directing the rays from the sun to a common point utilizing a plurality of mirrors. Various devices have been utilized, each of which have one or more shortcomings.

In accordance with a preliminary novelty search performed on behalf of the inventor, the following United States Patents of interest were disclosed:

| Pat. No. | PATENTEE | ISSUE DATE |
| --- | --- | --- |
| 509,390 | Paine | Nov. 28, 1893 |
| 514,669 | Allingham | Feb. 13, 1894 |
| 2,471,954 | Harvey | May 31, 1949 |
| 3,466,119 | Francia | Sept. 9, 1969 |

The field of search included the most pertinent subclass: 353-3.

U.S. Pat. No. 509,390 to Paine discloses a solar heater wherein the various mirrors for directing the sun's rays are rotated by a common clockwork via a plurality of gears. The teachings of Paine are relatively complex as will become apparent from reading of the specification and drawings.

U.S. Pat. No. 514,669 to Allingham discloses a system wherein mirrors rotate about a central vertical axis. The mirrors tilt backward from drawn until noon and then tilt forward from noon until dusk.

U.S. Pat. No. 2,471,954 to Harvey is of incidental interest in that the device disclosed does not follow the sun. It does disclose, however, all mirrors being controlled by a single spindle which causes the focal length to vary along a central vertical axis. The $x$ and $y$ movements of the mirrors are interconnected.

U.S. Pat. No. 3,466,119 to Francia discloses a motor driven worm gear which drives a toothed wheel on a shaft, such as shown as FIGS. 3 to 5 thereof. Other toothed wheels drive a chain which rotate the various shafts. Individual cables are carried on each shaft which controls a mirror. Disadvantageously, however, Francia varies the mirrors in a north-south direction on an incremental basis, as shown by his toothed wheel in FIG. 4.

SUMMARY OF THE INVENTION

It is an object of this invention to provide a new and improved heliostat wherein the mirror or mirrors are continuously pivoted in a north-south direction on an annual cycle and is pivoted in an east-west direction on a daily cycle.

Anothr object of this invention is to provide a new and improved heliostat which is substantially gear-free.

In accordance with a preferred embodiment of this invention, the heliostat includes a plurality of mirrors which are arranged in an array of rows and columns. Each mirror has a reflective surface and a rear surface and a central axis through both surfaces. Each elongated rod of a like plurality has one end thereof coupled to the rear surface of a corresponding mirror which is oriented along the central axis thereof. Means are provided for pivoting each rod near one end with respect to support structures. Pairs of first guide rails are coupled to the support structures each pair being spaced apart to form a track therebetween for receiving depending portions of the rods so that the rods traverse pivotable paths within the tracks within planes each perpendicular to a first common fixed plane. Each pair of a plurality of pairs of second guide rails is spaced apart to form a track therebetween for receiving depending portions of the rods near their opposite ends so that the rods traverse pivotable paths within the tracks within planes each perpendicular to a second common fixed plane. A plurality of arms couple the second guide rails to a frame so that the arms are pivotable with respect to the frame. First means are provided for pivoting all of the first guide rails along loci parallel to the first fixed plane and second means are provided for pivoting all of the second guide rails along loci parallel to the second fixed plane.

In accordance with certain features of the invention, one of the fixed planes can be oriented along an east-west direction and the other of the fixed planes can be oriented along a north-south direction.

In accordance with another embodiment of the invention, the heliostat can include a mirror, means fo pivoting the mirror in east-west direction on a daily cycle, relative to the apparent east-west movement of the sun and means for continuously pivoting the mirror in a north-south direction on an annual cycle relative to the apparent north-south movement of the sun.

BREIF DESCRIPTION OF THE DRAWINGS

Other objects, advantages, and features of this invention will become more apparent when read in conjunction with the following drawings, in which.

DESCRIPTION OF A PREFERRED EMBODIMENT

Figure 1:
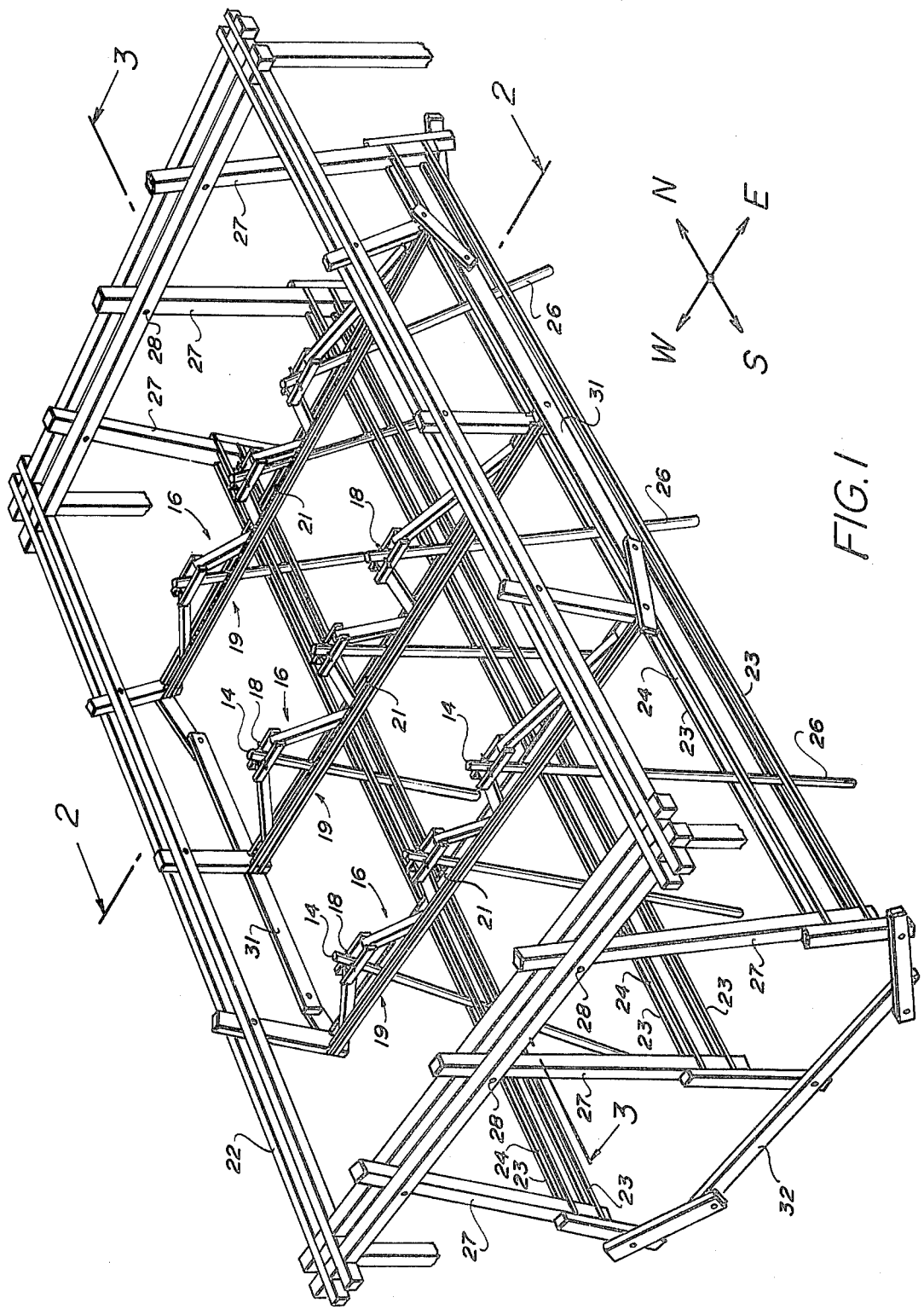
FIG. 1 is a perspective view of one embodiment of this invention.

Referring to the drawings, the mirrors are not depicted in FIG. 1 for simplicity of description. The various mirrors are depicted, however, in FIGS. 2 and 3.

As shown in the drawings, a plurality of mirrors 10—10 are arranged in an array of M rows and N columns. As depicted in the drawing, both M and N are shown as three. However, larger numbers ranging upward to as many as desired are practical.

Figure 2:
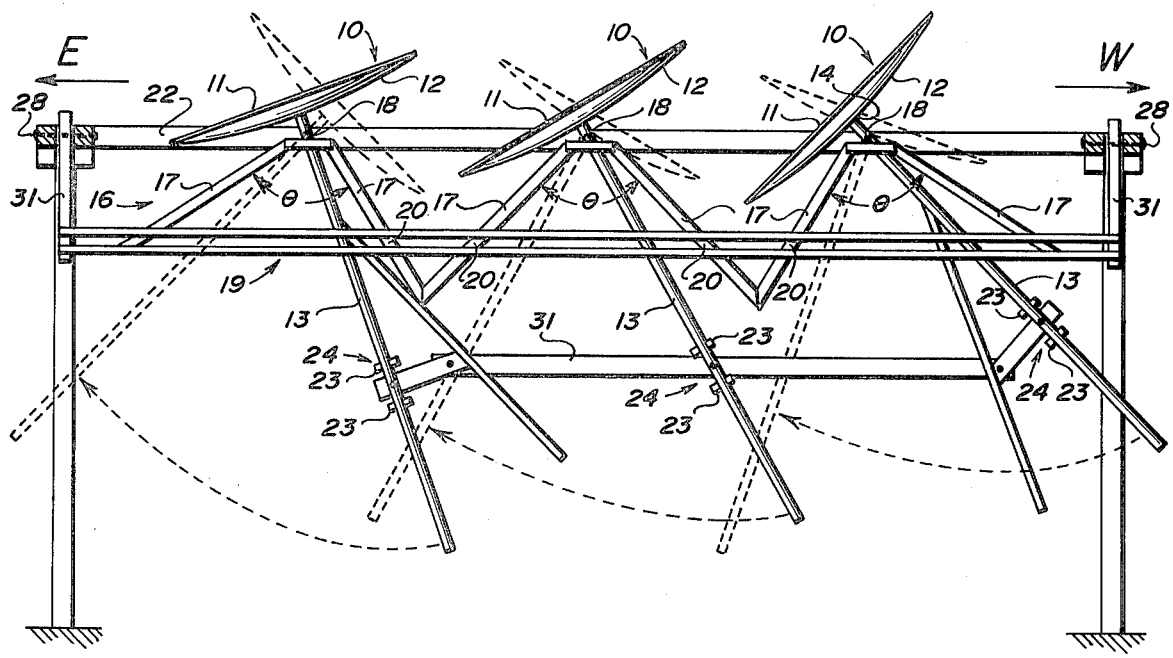
FIG. 2 is a sectional view taken along the line 2—2 of FIG. 1.
Figure 3:
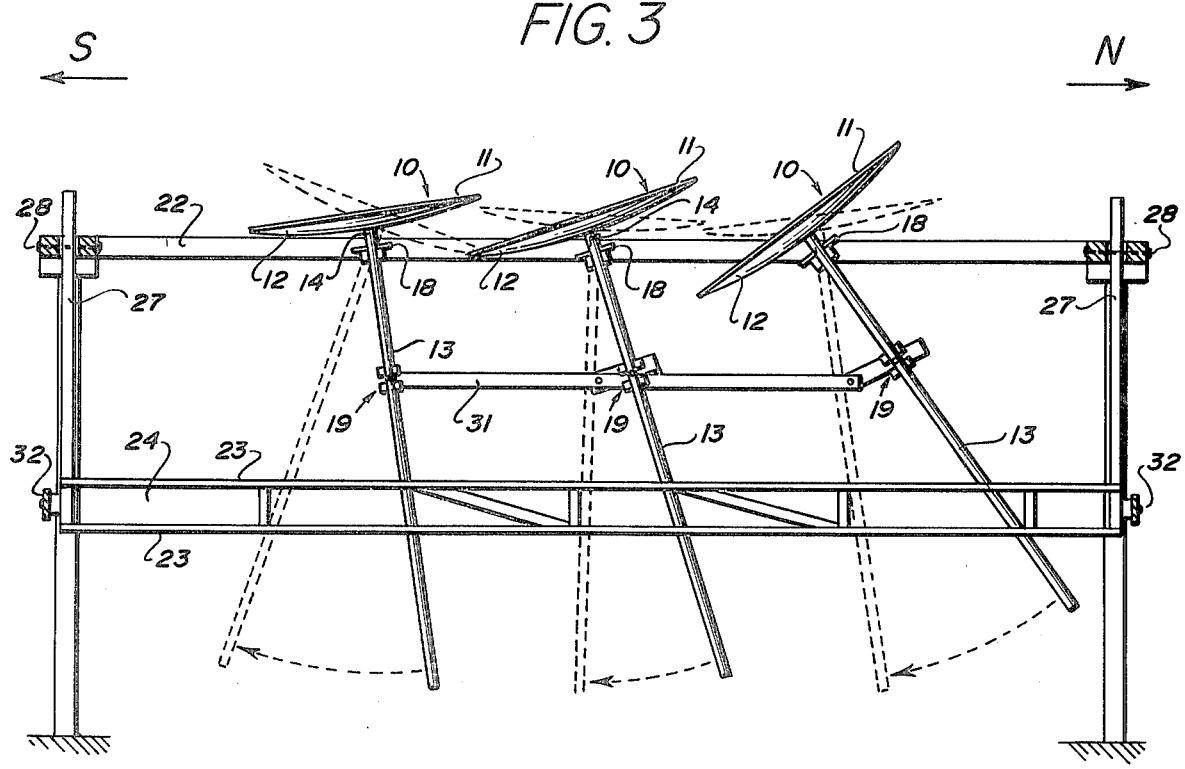
FIG. 3 is a sectional view taken along the line 3—3 of FIG. 1.

As shown in FIG. 2, the mirrors are arranged in rows, and, as depicted in FIG. 3, the mirrors are also arranged in columns. As depicted in FIG. 1, the mirrors are arranged in both rows and columns in a rectangular array. It is, of course, within the scope of this invention to include arrays in which mirrors at a corner may be eliminated for various reasons including cost and simplicity.

The various mirrors 10—10 each have a reflective surface 11 and a rear surface 12. Each mirror 10 has a central axis which goes through the two surfaces 11 and 12.

A plurality of rods 13—13 are provided corresponding in number to the plurality of mirrors 10—10. One end 14 of each rod 13 is coupled to the rear surface 12 of the corresponding mirror 10 along the central axis of such mirror.

A plurality of support structures 16—16 is depicted in FIG. 1, one of such support structures 16 being depicted in FIG. 2. The support structure 16 includes trusses 17—17 arranged in an interconnected fashion, as depicted in FIG. 2, forming angles θ at their uppermost ends which angles θ may or may not be equal; however, the angle θ, desirably, is at least equal to 90°.

At the uppermost junctions of the trusses 17—17 of the support structures 16 are provided pivoting means 18—18 so that each rod 13 can be pivoted near its end 14 at the pivot point 18 at the support structure 16.

N pairs of first guide rails 19 are coupled to the support structure 16, as at 20—20, each pair of guide rails 19 being spaced apart to form a track 21 therebetween. The tracks 21 each receive depending portions of the rods 13 so that the rods 13 traverse pivotable paths within the tracks 21 within planes each perpendicular to a first common fixed plane, such as the north-south plane depicted in FIG. 1.

The various support structures 16 are supported, as shown in FIG. 1, by a frame 22.

Second guide rails 23, as shown in FIG. 1, include N pairs (three being depicted, but as stated earlier many more can be utilized), each pair of guide rails 23 being spaced apart to form a track 24 therebetween. The track 24 receives depending portions of the rods 13 near their opposite ends 26 so that the rods 17 traverse pivotable paths within the tracks 24 within planes each perpendicular to a second common fixed plane such as, shown in FIG. 1, the east-west plane. The second common fixed plane, the east-west plane, is perpendicular to the first fixed plane, the north-south plane.

A plurality of arms 27—27 couple the second guide rails 23—23 to the frame 22 in such a manner that the arms are pivotable as at 28—28 with respect to the frame 22.

The first guide rails 19 are all interconnected by a pivotable mechanism 31 which, in turn, is pivotably connected to the frame 22 as to pivot all of the first guide rails 19 along loci parallel to the first fixed plane or north-south axis.

Second pivoting means 32 are provided which are coupled to each of the second guide rails 23—23 for pivoting all of the second guide rails 23 along loci parallel to the second fixed plane or east-west axis.

The first pivoting means 31 can be moved in a reciprocating manner in a direction from the lower left hand portion of the drawing to the upper right hand portion of the drawing and back again (as viewed in FIG. 1, or from left to right as viewed in FIG. 3) on an annula basis i.e., to the apparent north-south movement of the sun. Namely, the first means 31 would be at one extreme when the sun is directly above the Tropic of Cancer and would be at the opposite extreme when the sun is directly above the Tropic of Capricorn. The first means 31 would be reciprocated, in essence, on an annual basis so that the mirrors are directed at a southernmost direction at the beginning of winter (in the northern hemisphere) and in the northernmost direction at the beginning of summer (also in the nothern hemisphere).

The second means 32 is oscillated to and fro on a daily basis (i.e., relative to the apparent east-west movement of the sun) namely, the mirrors are directed in an easterly direction at sunrise and its most westerly direction at sunset. From the period of sunset to sunrise, the mechanism is returned to the opposite direction, again.

The motion of the first means 31 is continual and not incremental, since assuming that the beginning of summer occurs at 9:30 am. on June 21, it will be apparent that at 4:30 p.m. on that same day, the sun will have traversed an angular position somewhat southerly.

Referring to the drawings, in operation, assume that the sun rises in the east (which occurs precisely at the onset of summer at the Tropic of Cancer). On all other days, the sun rises in a generally easterly direction and at sunrise its southern component is almost negligible. At sunrise, the means 32 is directed mostly in the left hand position, causing the mirrors to be oriented in a rightmost or easterly direction. The light from the sun will be reflected by the mirrors upon a common spot, such as a boiler directly above the heliostat (not shown). It is not necessary that such a boiler be directly above the heliostat, it can be over towards one side but it is desired that the boiler be directly above the heliostat for maximum efficiency.

As the sun rises, and, past the meridian, falls in the west, the means 32 continues to move toward the right, directing the mirrors towards the left or towards the west, as depicted in FIG. 1. After the sun sets, the member 32 is reciprocated back again to its opposite position so as to be in position to repeat its operation the following day.

For simplicity of description, the mechanism for reciprocating the member 32 is not depicted. However, the mechanism 32 is reciprocated in a timed sequence by an appropriate mechanism which can be provided by those skilled in the art. Mechanisms for reciprocating on a daily basis or on a timed basis can be simply provided and it is not within the scope of this invention to set forth such a daily reciprocating mechanism.

The member 31 reciprocates from left to right, as depicted in FIG. 3, or as depicted in a skewed manner from lower left to upper right in FIG. 1, gradually and continuously throughout the seaons, going in one direction as the sun apparently travels from the Tropic of Cancer to the Tropic of Capricorn and returning in the opposite direction when the sun apparently travels from the Tropic of Capricorn to the Tropic of Cancer. The member 31 does not have a day to day or periodic intermittent adjustment, but the mechanism 31 continuously moves, since the relative north-south position of the sun continuously varies throughout a day and does not incrementally shift from day to day. As started earlier, whereas the sun may rise in an easterly direction, which is, for example, directly above the Tropic of Cancer at 9:30 a.m. on a particular day, when it sets in the west, the sun is slowly moved to a position somewhat southerly of the Tropic of Cancer so that the motion of the member 31 is continuous.

As in connection with the mechanism 32, the mechanism 31 can be gradually reciprocated by timed mechanisms so as to provide for the continuous angular movement of the sun from directly above (e.g. at the Tropic of Cancer) to the furthermost position when it is directly above the Tropic of Capricorn. The variation, the to and fro movement of the mechanism 31, is performed at an oscillatory rate, such rate tending to be sinusoidal if the mechanism were to be operated at the equator, but tending to be at some other oscillatory rate north and south of the equator. Each variation can be generated by an appropriate calculation by using various trigonometric calculations depending upon the specific longitude of operation. Again, the specific mechanism for reciprocating the mechanism 31 is not detailed, but it is within the scope of the art to provide appropriately timed mechanisms.

It will be apparent from a view of the drawings, the various angles and lengths of various components can be varied so as to direct the mirrors upon varying desired focal lengths. As shown in the drawing, one particular focal length is utilized; that is, all the mirrors are directed to one specific focus. If it is desired to change the focus of the mirrors, the various members should be reconstructed for such different focal length. However, assuming a given focal length, and a boiler provided at a specific distance from the heliostat, no further modification or adjustment of the heliostat need be made. Thus, the heliostat, once constructed, can be placed into operation without any complicated adjustments being made thereto.

With applicant's teachings, it is readily apparent that the complex mechanisms of the prior art utilizing various different types of gears has been substantially eliminated, the overall system operating on a basis of various pivoting mechanisms in lieu of complex gearing mechanisms.

What is claimed is:
1. A heliostat comprising
   a plurality of mirrors arranged in an array of $m$ rows and $n$ columns, each mirror having a reflective surface and a rear surface and a central axis through each surface;
   a like plurality of elongated rods, each rod coupled at one end thereof to the rear surface of a corresponding mirror and oriented along the central axis thereof;
   $n$ support structures;
   pivotal support means for pivotably supporting each rod, near said one end, with respect to said support structures;
   $n$ pairs of first guide rails coupled to said support structures, each pair being spaced apart to form a track therebetween for receiving depending portions of said rod to enable said rods to traverse pivotable paths within said tracks within planes each perpendicular to first common fixed plane;
   a frame for supporting said support structures;
   $m$ pairs of second guide rails, each pair being spaced apart to form a track therebetween for receiving depending portions of said rods near their opposite ends to enable said rods to traverse pivotal paths within said tracks within planes each perpendicular to a second common fixed plane, said second common fixed plane being perpendicular to said first fixed plane;
   a plurality of arms coupling said second guide rails to said frame so that said arms are pivotable with respect to said frame;
   first means for pivoting all of said first guide rails along loci parallel to said first fixed plane; and
   second means for pivoting all of said second guide rails along loci parallel to said second fixed plane.
2. The invention as recited in claim 1 wherein one of said fixed planes is oriented along an east-west direction, and the other of said fixed planes is oriented along a north-south direction.

* * * * *